United States Patent [19]

Muselli

[11] Patent Number: 5,044,064
[45] Date of Patent: Sep. 3, 1991

[54] MACHINE TOOL WITH END EFFECTOR REPLACEMENT

[75] Inventor: Roberto Muselli, Piacenza, Italy

[73] Assignee: Jobs S.P.A., Piacenza, Italy

[21] Appl. No.: 528,828

[22] Filed: May 24, 1990

[30] Foreign Application Priority Data

Sep. 11, 1989 [IT] Italy .................. 44815 A/89

[51] Int. Cl.⁵ .................. B23Q 3/155; B66C 3/00
[52] U.S. Cl. .................. 29/568; 414/732; 901/41
[58] Field of Search .................. 29/568; 409/201, 204, 409/211, 216; 901/41, 42, 30, 29, 47; 414/729, 735, 732, 730

[56] References Cited

U.S. PATENT DOCUMENTS

| 3,823,645 | 7/1974 | Sukhov et al. | 409/201 X |
| 4,042,161 | 8/1977 | Ando | 901/42 |
| 4,229,136 | 10/1980 | Panissidi | 414/730 |
| 4,317,560 | 3/1982 | Troyer | 901/16 |
| 4,604,787 | 8/1986 | Silvers, Jr. | 29/568 |
| 4,650,959 | 3/1987 | Swenjrud et al. | 901/42 X |
| 4,737,611 | 4/1988 | Humblot | 901/30 X |
| 4,778,329 | 10/1988 | Phillips | 901/16 X |

FOREIGN PATENT DOCUMENTS

| 2209031 | 10/1972 | Fed. Rep. of Germany | 29/568 |
| 197709 | 10/1977 | U.S.S.R. | 901/42 |

Primary Examiner—William Briggs
Attorney, Agent, or Firm—Notaro & Michalos

[57] ABSTRACT

Automatic machine tool designed for the assembly of mechanical sub-assemblies such as aircraft, automobile and vessel structures, etc., comprising equipment used for rapid coupling and changeover of multi-task end effectors (MTEE), the equipment presenting a pair of Cartesian axes after two polar axes.

18 Claims, 9 Drawing Sheets

MACHINE TOOL WITH END EFFECTOR REPLACEMENT

BACKGROUND OF THE INVENTION

The invention relates to an automatic machine tool equipped with coupling devices which allow automatic replacement of end effectors so that a number of different tasks such as those involved in the assembly of aircraft panels can be performed in succession, the entire cycle of necessary jobs such as drilling, countersinking, glueing, rivet driving and hammering or pressing being performed in rapid succession, fully automatically, with no need to move the panel or the principal axes of the machine or both.

For the sake of clarity, the meaning of the technical terms used herein is set out below.

END EFFECTOR (EE): single electrically/pneumatically/hydraulically operated mechanical unit (effector) designed to perform preset basic operations MULTITASK END EFFECTOR (MTEE): multiple interchangeable mechanical unit (effector) comprising one or more electrically/pneumatically/hydraulically operated EE designed to perform preset operation sequences AIRCRAFT PANEL: fuselage and/or wing surface structure subassembly TWIST HEAD: bi-rotating operating head PIVOT POINT (PP): central pivoting point of the twist head TOOLING: all fixtures, rests and end effectors CNC: computerised numerical control FASTENERS: elements used to effect rigid assembly of different parts of mechanical sub-assemblies, comprising pop rivets, solid rivets, bolts, hi-lock rivets, lock-bolt rivets, LGP rivets, anchor nuts and temporary fastenings such as log bolts, blind rivets, etc.

During the assembly of aircraft structures, and in particular during panel assembly, considerable difficulties are encountered because various operations need to be performed to extremely fine tolerances on pieces which are difficult to position and maneuver such as panels.

While the various components of the aircraft structure, and in particular the panels, constitute a unit resistant to considerable stresses once assembly is completed, they are extremely delicate and need to be handled with great care before assembly. In view of the fact that the length and/or width of the panels is often between 5 and 12 meters while the thickness is only 2 or 3 millimeters, that they present a curved surface, and that the various assembly operations have to be performed to tolerances of a tenth of a millimeter, the difficulties encountered are evident. For example, in order to assemble the metal sheets with the ribs and spars constituting the framework of an aircraft, or join the panels thus obtained one to another, fasteners such as nails or rivets are used. In order to apply them a hole must be drilled, then countersinking is performed and operations on the hole surface such as pretensioning are carried out; where necessary a layer of adhesive is applied, and finally the fastener is installed. All these operations must necessarily be performed with the greatest precision and speed.

For example, the tolerances required when driving some types of rivet must not exceed one or two hundredths of a millimeter as the rivet would otherwise be forced against the hole surface, damaging it and causing the panel to be scrapped. Once hammered in the rivet must be flush with the outer edge of the panel, neither projecting nor receding, in order to comply with aerodynamic requirements.

In order to perform all these operations with the necessary precision manual technology is used, supported by highly complex, costly equipment including automatic dedicated machine tools fitted to specially made units. These machines can be divided into two major categories—in the first case, the panel is fixed to mobile support structures to allow the machine to reach the fastener installation positions, while in the second, the machine moves and the panel does not. Both these systems present considerable limitations and drawbacks, however.

In the case of machines falling into the first category, the panels machined are secured to huge mobile supports. Great difficulty is obviously encountered in making structures to which curved panels only a few millimeters thick with an area of 50–60 sq.m. can be secured; the panels must be positioned on the structure with great precision and secured to it in such as way as to prevent even the slightest relative movement during machining. The result is a very large, heavy, complex structure which is required to move to very fine positioning tolerances in order to bring the various parts of the panel to the tool as required. This system also presents the serious drawback of requiring very long machine stoppages whenever the tooling has to be replaced so that a different job can be performed, e.g. in order to change over from drilling to rivet driving.

For this purpose it is necessary to shut down the entire machine, change the tool holders, tools and fixtures manually, and then clear the machine, i.e. reset all references, mechanical and electronic zeros etc. before starting on a different job. For this reason it is necessary to perform a given job on one panel, then remove it from the support and store it and proceed with the same job on the next panel. When all panels are finished the machine is shut down, the necessary tools replaced and the panels repositioned one at a time on the support ready for the next task to be performed.

The limitations and drawbacks of the dedicated machines described above can be summarised as follows:

(a) very large mobile structures have to be constructed to perform controlled movements with fine tolerances (b) units have to be shut down for long periods whenever a different job is performed and the tooling has to be changed (c) the unit lacks flexibility because it is designed to do a given job and cannot be adapted for different operations (d) it takes a long time to finish each piece (e) a great deal of space is required to store a given number of panels between one operation and the next (f) the use of the machine is limited in flexibility as the most complex operations cannot be performed, especially in the case of sharply curving parts, partly because of interference between the workpiece, its rest and the machine.

The machines in the second category, one of which is described in Italian patent application No. 44804 a/88, comprise a mobile arm whose length is equal to three perpendicular axes, at the end of which is fitted a twist head with one or two degrees of freedom; this head can rotate around polar axes which thus constitute the last axes of the unit.

The end effector is fitted on the twist head; the effector may, for example, be represented by an electric chuck with corresponding automatically interchangeable tool. While this type of apparatus can be adapted to perform different jobs more easily than the first type, it does not wholly solve the problems described above. Although the panel remains fixed during machining, replacement of the end effectors is highly laborious and their structure is complex, as they must be equipped with various effectors for the positioning sequences of the individual units. In addition, the constraints due to the geometry of the head cause problems with automatic fastener feed connection, and require excessive lengths at the expense of precise positioning. This obviously means greater difficulty in repositioning the tool on the workpiece while remaining within the required tolerances.

There is consequently a strongly-felt need for a machine which automatically performs a succession of different tasks and features simplified replacement of the end effectors without shutting down the machine or moving the workpiece.

SUMMARY OF THE INVENION

For this purpose, this invention proposes a machine tool with automatic replacement of end effectors, of the type comprising a mobile arm whose length is equal to three Cartesian axes, with an operating head fitted to the end of it which moves along a pair of polar axes, a plate equipped with rapid coupling systems for one or more end effectors being fitted to the said operating head, the said plate being mobile in relation to the said head and a pair of Cartesian axes long. The resulting machine has a total of 7 degrees of freedom and the last axes in it are constituted by a pair of Cartesian axes.

BRIEF DESCRIPTION OF THE DRAWINGS

This invention will now be described in detail, by way of example but not of limitation, with special reference to the annexed figures in which.

DESCRIPTION OF THE PREFERRED EMBODIMENT

Figure 1:
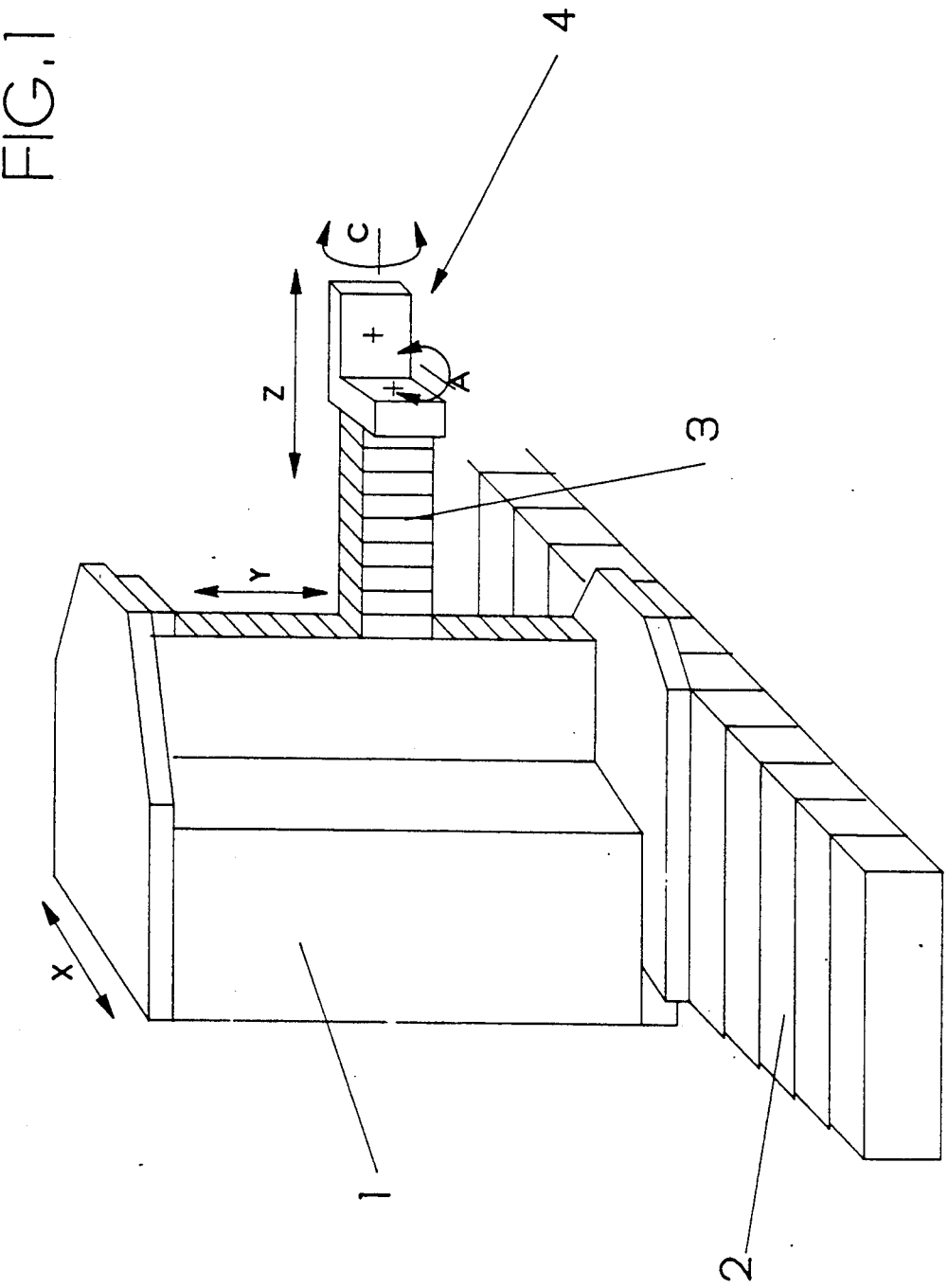
FIG. 1 shows a view of the machine according to the invention.

A machine in accordance with the innovation comprises (FIG. 1) a support 1 which moves along a base 2 in the direction of axis x, to which support is fitted an arm 3 which moves along axes y and z which, together with axis x, constitute a set of three Cartesian axes. At the end of arm 3 is fitted an operating head assembly marked 4; the operating head has two degrees of freedom defined by rotation axes A and C.

Figure 2:
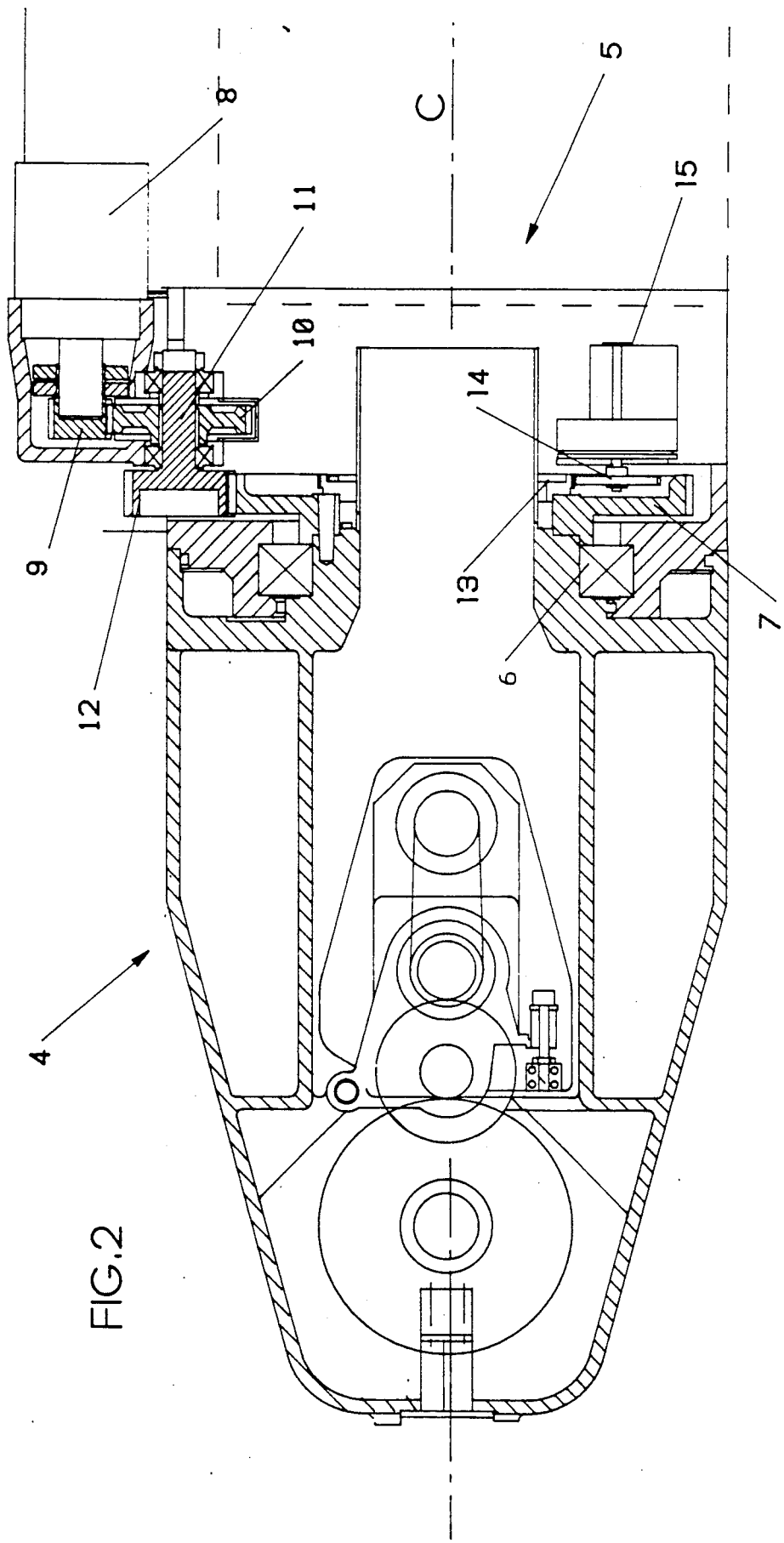
FIG. 2 shows a side view in partial cross-section of the operating head of a machine according to the invention.
Figure 3:
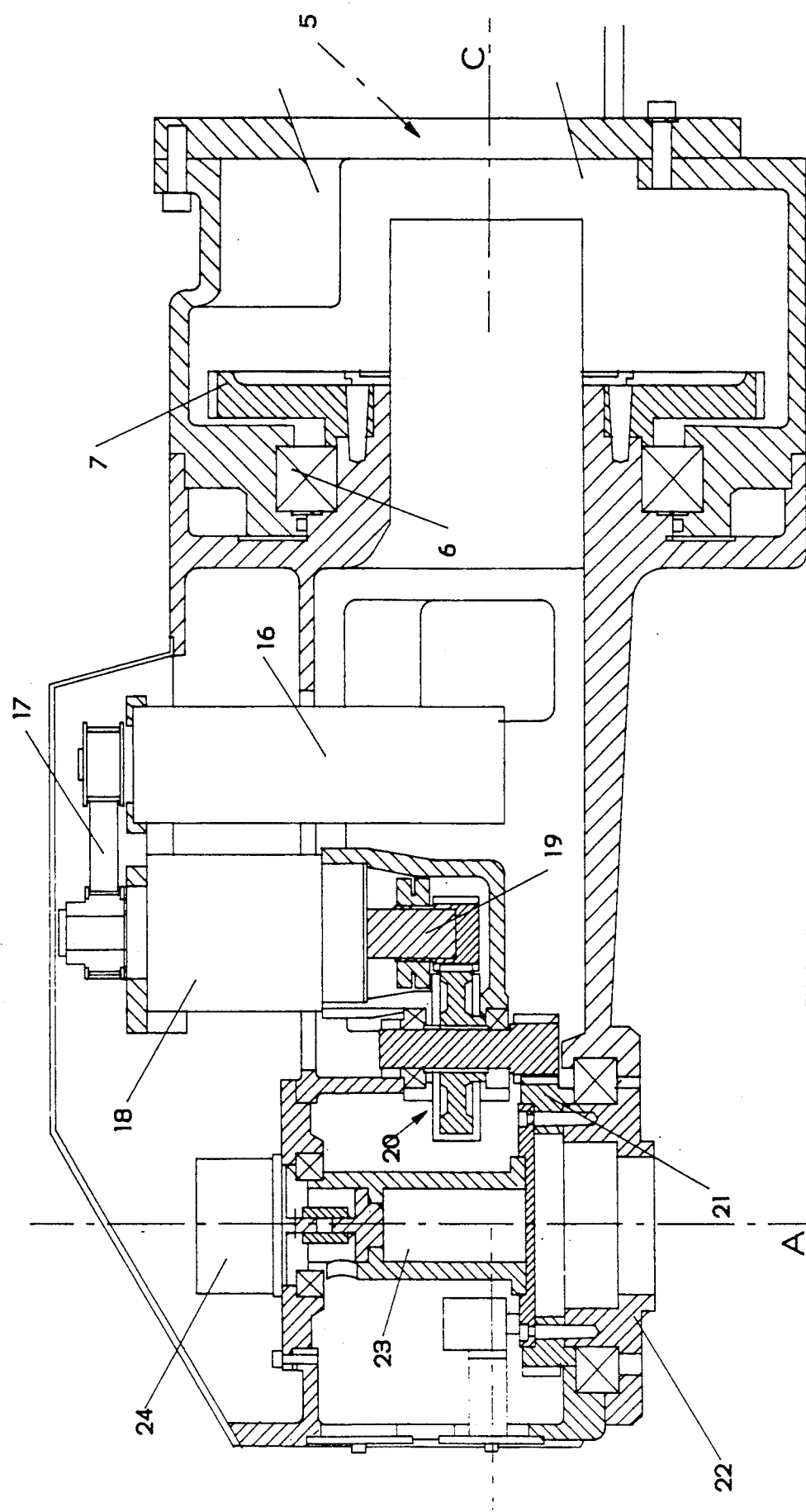
FIG. 3 shows a cross-section of the head illustrated in FIG. 2.

A plate with rapid couplings for the end effectors is fitted to head 4; this plate runs along a pair of guides perpendicular to one another so as to define a further pair of cartesian axes W and V, after rotational axes A and C. In FIGS. 2 and 3, no. 5 indicates the end of the arm to which head 4 is fitted. The head rotates around axis C of the arm while the end effector support plate rotates around axis A, which is perpendicular to axis C. The structure of head 4 is fitted to the arm with a thrust bearing 6, and a helical gear 7 is fitted to it (FIG. 3). A brushless DC motor 8 fitted to arm end 5 has a pinion 9 which engages with cogwheel 10 fitted on a shaft 11; a second cogwheel 12 which in turn engages with helical gear 7 is splined to shaft 11 (FIG. 2). This assembly constitutes the motor reducer system which controls the rotation of head 4 around axis C. In order to measure the rotations of this structure around axis C directly and precisely, a crown wheel 13 integral with head 4 is fitted; this engages with a cogwheel 14 of a transducer 15 which may be an encoder or a resolver, for example, depending on the type of electronics used for the machine.

Inside head 4, which has an L-shaped structure, there is a DC motor 16 (FIG. 3) connected via belt 17 to a reducer 18 whose pinion 19 engages with a reduction gear 20 of known type; this gear in turn engages a cogwheel 21 integral with a support flange 22, fitted to head 4 on combined crossed roller bearings, which can rotate around axis A (FIG. 3). In order to detect even the slightest movements of axis A precisely, a support 23 which carries a high-resolution encoder 24 in axis is fitted to flange 22.

Figure 5:
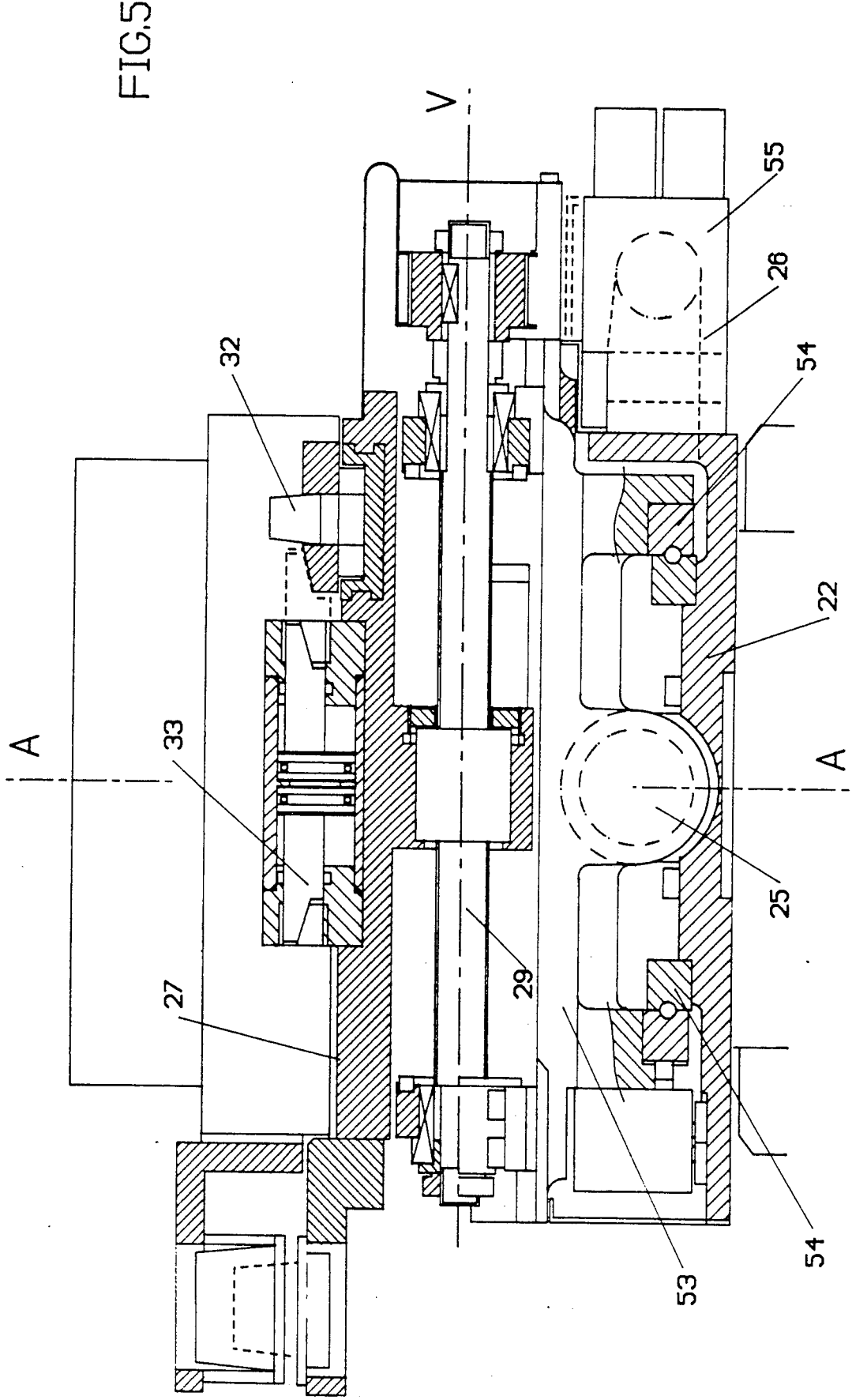
Figure 6:
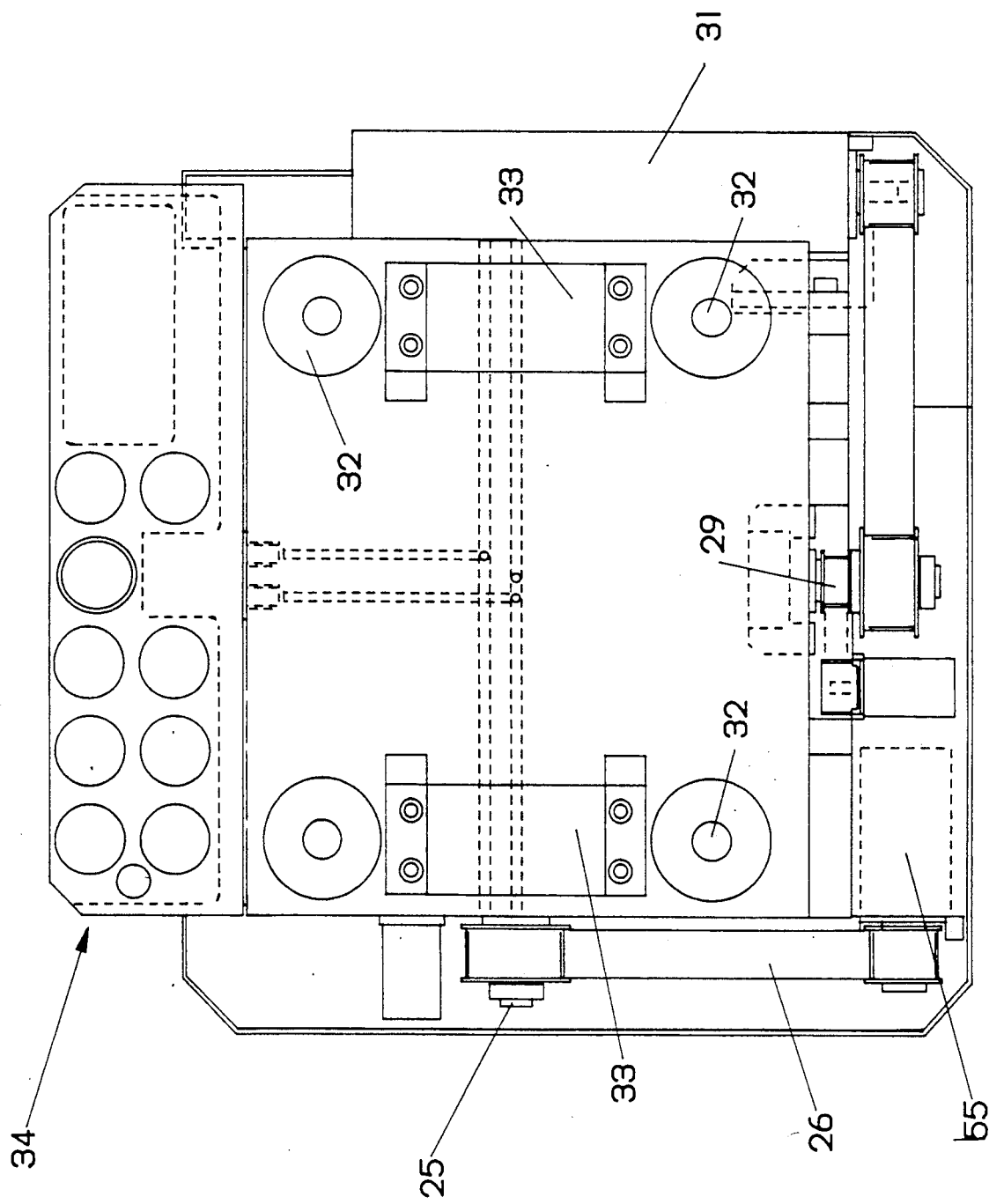
FIG. 6 shows a view of the end effector coupling plate.
Figure 7:
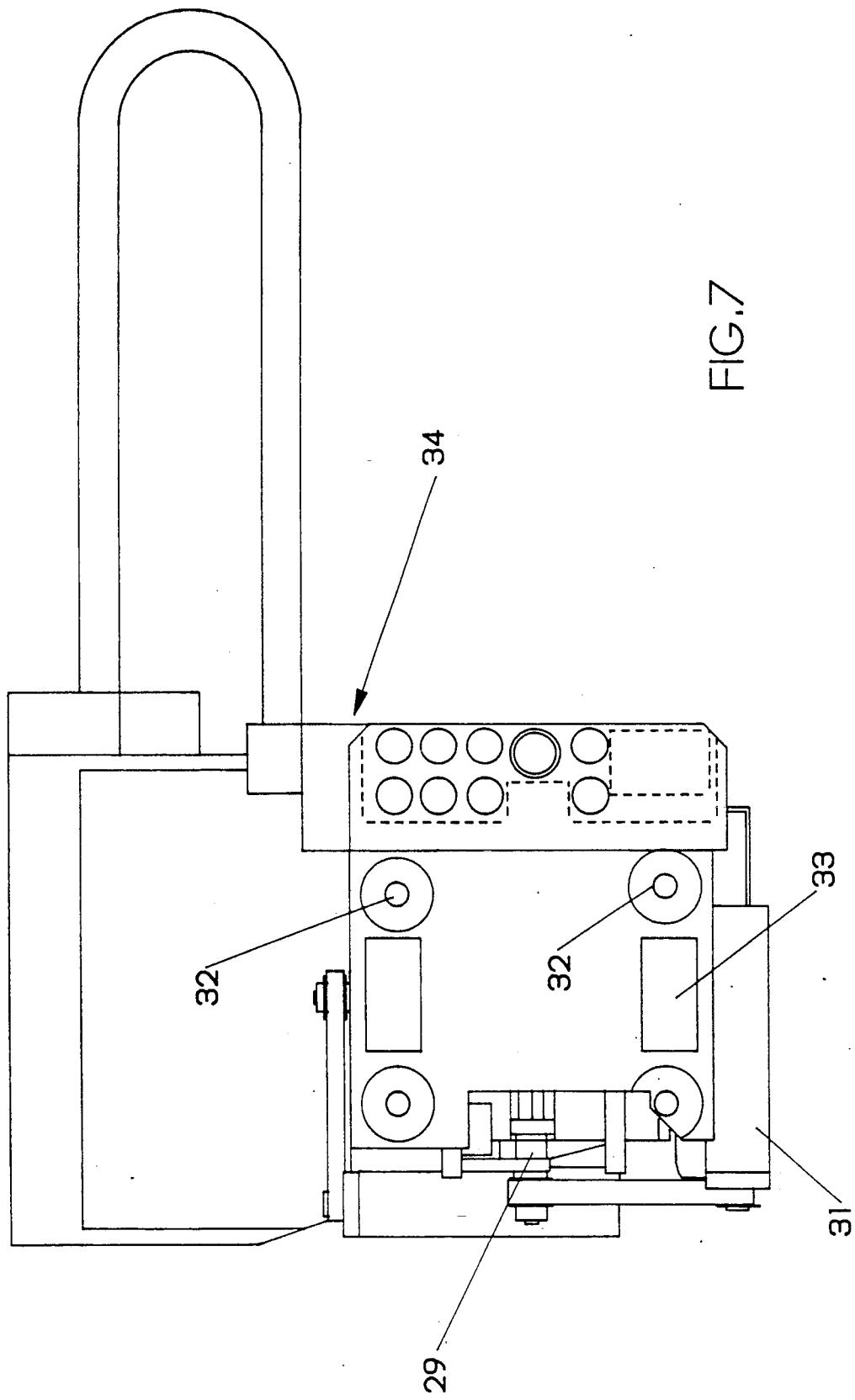
FIGS. 7 and 8 show two views of the operating head according to a pair of perpendicular axes.
Figure 8:
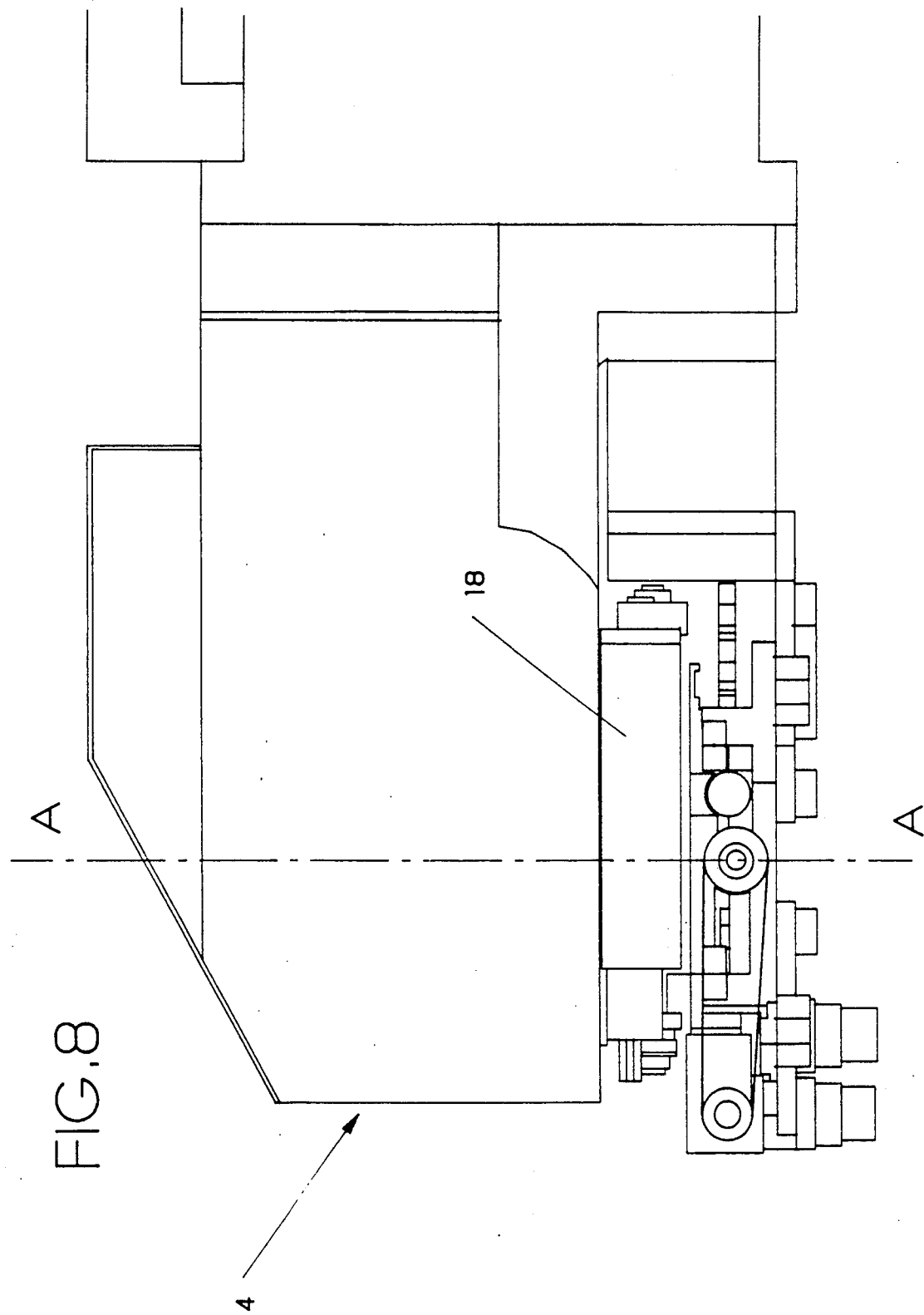
Figure 9:
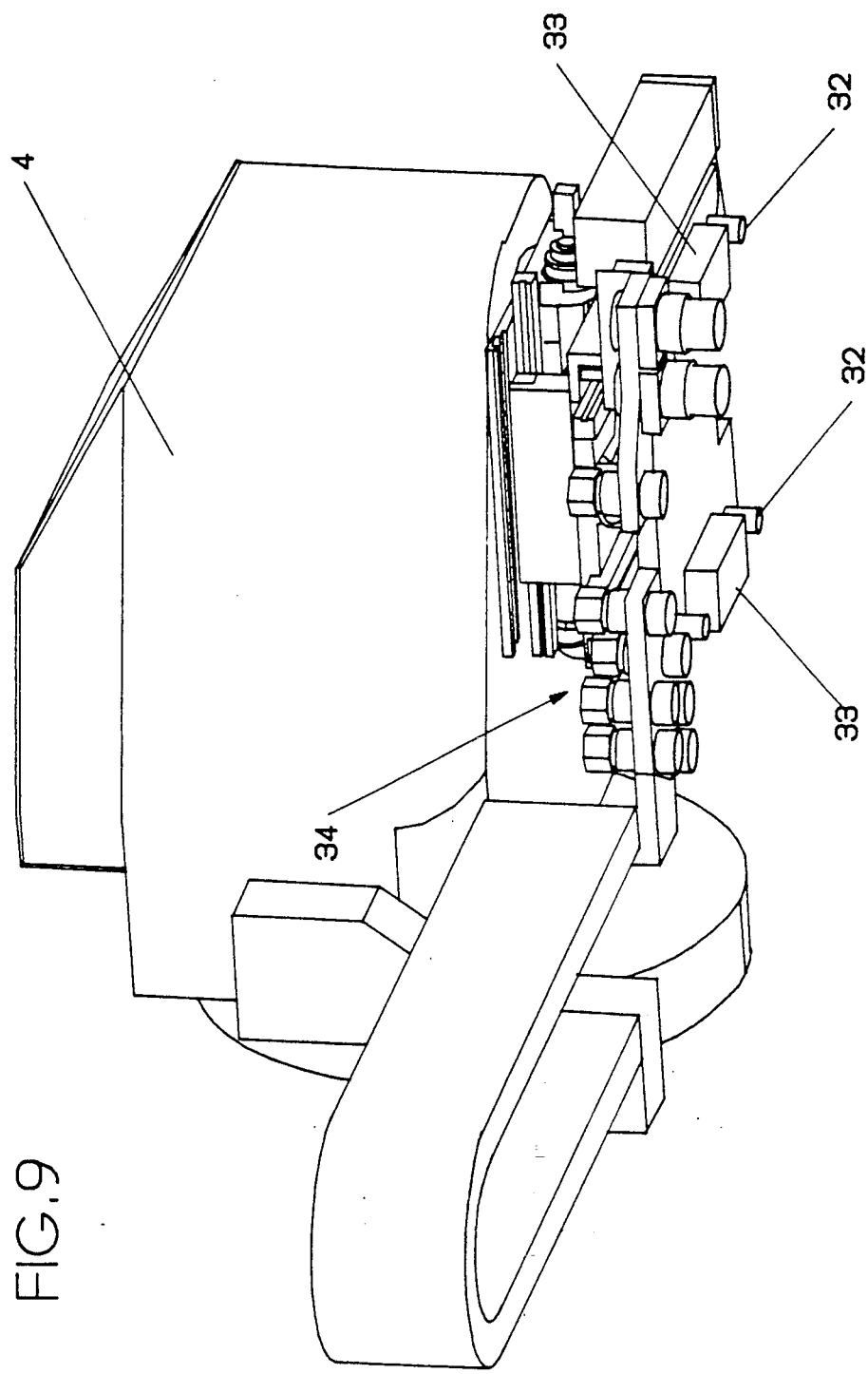
FIG. 9 shows a perspective view of the operating head.

A carriage 53 which runs along a pair of recirculating ball guides 54 is fitted to flange 22 (FIGS. 4 and 5); this carriage is operated by a screw 25 moved, via a belt 26, by a brushless motor 55. A similar carriage 27 is fitted to carriage 53 (FIG. 6); the former runs along guides 28, perpendicular to guides 54, moved by a screw 29 which is connected via a belt 30 to a motor 31. Carriage 27 is fitted with a set of mechanical, electrical, hydraulic and pneumatic couplings which house the end effector support structure and connect the electrical and pneumatic power supply to the effectors. A plan of carriage 27, which thus constitutes the end effector coupling plate, is shown in FIG. 6; this carriage is fitted with four pins 32, two pairs of hydraulic bolts or facing pistons 33 and a hydraulic, pneumatic, electrical etc. power supply coupling unit 34.

Carriage 53 moves along axis W of the machine parallel to the axis of screw 25, while carriage 27 moves in accordance with axis V, parallel to the axis of screw 29. The advantage of having two linear axes last lies in the fact that this system:

simplifies the end effectors, many of which would otherwise have to contain the axes which in this configuration are on the machine means that no positioning problems arise when end effectors are constructed with tools having different centre distances offers two numerical control movements instead of the pneumatic or hydraulic on/off movements used in known machines features programmable advance of the workpiece all of which characteristics provide the ideal technological operating conditions.

Figure 4:
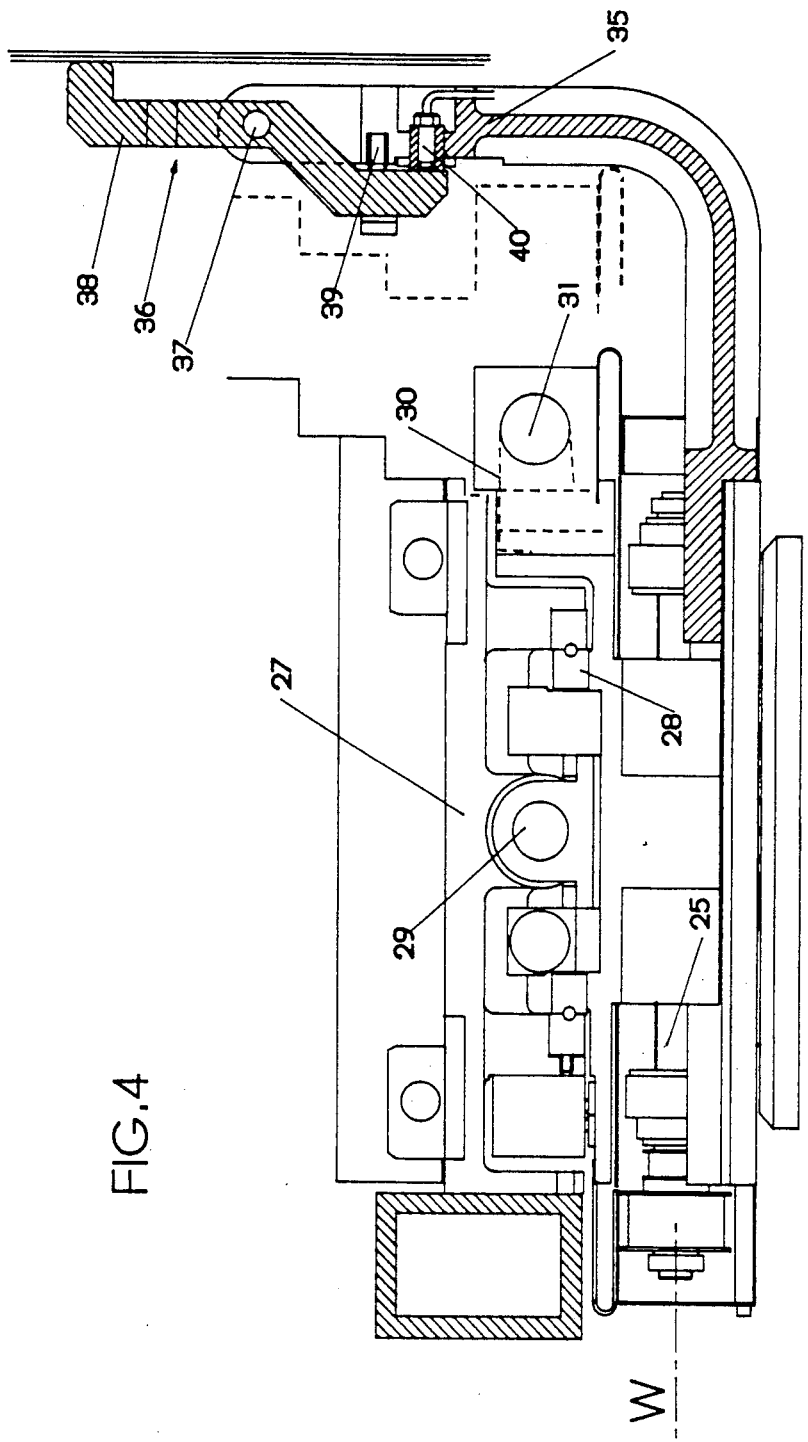
FIGS. 4 and 5 show the side view and cross-section according to perpendicular planes of the end effector support plate in the head illustrated in FIG. 2.

Support 35 of a pressure bar is fixed to flange 22 (FIG. 4), linked to the movements of axis A and independent of the movements of axes V and W. The pressure bar basically consists of an interchangeable lever 36 hinged at 37 to the structure; it presents one arm 38 shaped so as to press on the metal sheets allowing the passage of the tool, while the other arm is subject to the action of a spring and/or a pneumatic cylinder 39 which tends to rotate it clockwise as shown in FIG. 4. Lever 36, when turned anticlockwise, operates a microswitch 40 connected to devices which control all the movements of the machine.

The movements of the machine along axes V and W are controlled by a pair of resolvers of known type. For the purpose of use, it is first necessary to set up the end effectors, which can be freely selected from those commercially available; they are fitted to the corresponding supports equipped with standard couplings to the plate or carriage 27. The end effector supports each comprise one or more sliding plates to which the end effector is fixed; the plate is advanced or retracted along the support by pneumatic systems until each end effector reaches a fixed stop plate integral with the support. The end effector supports are equipped with connections designed for rapid coupling to plate 27 with no need for any manual operation. These systems, like the pneumatic devices which advance each end effector in relation to its support, are not described in detail as they are of known type. However, it should be noted that the special L-shaped structure of the head means that the unit does not need to be fitted with a particular type of end effector; any type and above all any length can be used without affecting the end result. In fact, it is possible to fit all the end effectors so that the tip of the tool is equidistant from the pivot point. This is impossible with twist heads of known type, as the end effector is fitted inside a bracket which means that its rear dimensions must be limited in order to comply with the required tolerances. The fact that all tools can be fitted in alignment, so that when they are brought into axis with the workpiece their tips are at the same distance from the pivot point, means that the same positioning precision can be obtained with all tools, regardless of their dimensions. In practice, end effectors of any size can be used regardless of length, provided that they are preset in accordance with the appropriate length and that the end of the tool is brought alonside the arm.

When the end effector support has been prepared, the machine is ready for automatic operation; the operating head is moved to the support for automatic coupling and is then brought into axis with and perpendicular to the point to be worked on.

The machine is positioned so as to bring part 38 of the pressure bar against the panel to be assembled; the advance continues until lever 36, counteracting the force exerted by spring 39, operates microswitch 40. Lever 36 has a hole at its upper end shown in FIG. 4, through which a tool on the end effector mounted to carriage 27 passes. If necessary, a suitable stop plate relating to the operations performed on the opposite side of the panel can be fitted on the other side, or it might be useful to add a similar machine equipped with one or more multi-task end effectors designed for synchronised performance of operations complementary to the first. (Alternatively, the complementary operations could be performed semi-automatically by an operator equipped with conventional tools).

When the end effector support has been coupled, the machine control devices pneumatically advance the first effector until it meets the fixed stop plate of its support; plate 53 then advances along axis W, performing the required task and controlling the movements of the end effector with the required precision by CNC.

At the end of this first stage the end effector retracts, after which the machine activates motor 31 to control the traverse of carriage 27 along axis V until the second end effector is perpendicular to the workpiece; the effector is then pushed against the fixed stop plate. Motor 55 is again activated; by means of screw 25 it advances carriage 53 along axis W to perform the second job on the panel, and so on.

At the end of the entire series of operations performed on the panel with the multi-task end effector dedicated to a given type of fastener, the machine moves to place that effector on the end effector support and picks up a different one, suitable for another type of fastener, which is automatically coupled to plate or carriage 27 and secured by hydraulic bolts 33.

As the plate is equipped with rapid coupling devices for a support to which one or more end effectors with corresponding tools are fitted, once the head has been brought into axis with the point to be worked on, the tool can be advanced by moving the plate along axis W; when the tool again retracts the plate can be moved along axis V to bring the second tool perpendicular to the point to be worked on and so forth, until the entire series of operations required on that point has been performed, without moving the principal axes (X. Y, Z, A and C) of the machine. To change over to a different type of job, it is sufficient to replace the plate with another one fitted with the necessary end effectors; this operation can be performed automatically by the machine.

Every support with one or more end effectors is therefore described as multi-task because it is capable of performing an entire logical sequence of operations designed to instal a type of fastener permanently. The necessary multi-task end effectors can therefore be picked up automatically and moved to perform the jobs required. The fact that there is a plate fitted with several end effectors means that once the machine has been positioned, the cycle of operations can be performed without moving the principal axes, involving evident advantages in terms of time saving and precision.

The L shape of head 4 has proved particularly advantageous as it enables most commercially available tools to be used, including manual types, of any size and shape. Moreover, tool length is unimportant as the tools are fitted to one side of the head without other encumbrances; this means that they can all be positioned so that they have the same point of rotation which is as close as possible to the panel, producing fewer departures from the required position.

I claim:

1. An automatic machine tool of the type which uses end effectors, comprising:
   a main support;
   means for moving the main support on a set of three Cartesian axes;
   an operating head mounted to said support;
   means for rotating said head around a pair of rotational axes with respect to said main support;
   equipment mounted to said operating head for movement on the three Cartesian axes and the pair of rotational axes, said equipment carrying at least one end effector;

means for automatically changing end effectors which are carried by said equipment; and means for moving said equipment along two additional axes, in addition to the set of three Cartesian axes and the pair of rotational axes, by numerical control, to move an end effector carried by said equipment and to change end effectors carried by said equipment, without movement of said main support on the set of three Cartesian axes.

2. An automatic machine tool according to claim 1, wherein said means for moving said equipment along the two additional axes by numerical control, also moves an end effector carried by said equipment without moving the operating head on the pair of rotational axes.

3. An automatic machine tool comprising:

a main support;

means for moving the main support along a set of three Cartesian axes;

an operating head fitted to said main support;

means for rotating said head on said main support around at least two rotational axes with respect to said main support;

means for holding an end effector fitted to said operating head for movement on said operating head; and means for moving the means for holding an end effector, on at least two additional Cartesian axes;

said means for holding an end effector comprising a plate connected to the operating head, coupling equipment for supporting at least one end effector, said means for moving said head comprising displacement means connected between said plate and said coupling equipment for movement of said coupling equipment on the at least two additional Cartesian axes with respect to the plate.

4. An automatic machine tool comprising: a support, means for moving said support along a set of three Cartesian axes, an operating head fitted to said support, means for moving said head with respect to said support in a plurality of additional degrees of freedom corresponding to an equal plurality of rotation axes, a plate connected to said operating head, couplings connected to said plate for supporting at least one end effector, and means connected to said plate for movement of said plate along at least two additional axes which are in addition to said set of three Cartesian axes and said rotational axes, to move an end effector connected to said plate without movement along said set of three Cartesian axes between said support and said operating head, said means connected to said plate being connected between said plate and said operating head, said additional axes being perpendicular to each other said couplings supporting an end effector on said plate, the end effector having a working axis, said working axis corresponding to one of said pair of additional perpendicular axes.

5. An automatic machine tool comprising a main support, means for moving said main support along a set of three Cartesian axes, an operating head mounted to said main support, means for rotating said head around two rotation axes with respect to said main support, and equipment for rapidly coupling and uncoupling an additional support for supporting end effectors, to said operating head, said equipment including means for moving said additional support with at least one end effector carried thereon, along two additional Cartesian axes and for moving an end effector coupled to said additional support without moving said main support on any one of said set of Cartesian axes and without rotating said head around any of said rotation axes.

6. An automatic numerically controlled machine tool, comprising:

a base;

an operating head mounted for movement to said base;

means connected between said head and said base for moving said head linearly along three orthogonal Cartesian axes (X, Y, Z) and two orthogonal rotation axes (A, C);

a plate mounted for movement to said head;

means connected between said plate and said head for moving said plate linearly along two additional orthogonal axes (W, V) with respect to said head without movement of said head with respect to said base on any one of said three orthogonal axes and without movement of said head around either of said two rotational axes; and means for coupling at least one end effector to said plate so that multiple operations can be performed by an end effector mounted to said plate with movement of said plate along said two additional orthogonal axes only and without movement along said first mentioned three orthogonal axes and said two rotational axes.

7. An automatic machine tool according to claim 6, wherein said means connected between said plate and said head comprise a first carriage mounted for movement to said head linearly along one of said two additional orthogonal axes, and a second carriage mounted for movement to said first carriage along the other of said two additional orthogonal axes, said second carriage carrying said plate.

8. An automatic machine tool according to claim 7, wherein said means connected between said head and said base comprises a support mounted for linear movement to said base along one of said first mentioned three orthogonal Cartesian axes, an arm mounted to said support for linear movement along a second and third one of said first mentioned three orthogonal axes, said arm having one end connected to said support and an opposite end connected to said head, said head being mounted for rotation around one of said two rotation axes at said opposite end of said arm.

9. An automatic machine tool according to claim 8, including a pressure bar connected to said head for engaging a workpiece with movement of said head on any one of said three first mentioned orthogonal axes and two rotation axes, said plate being movable on said two additional orthogonal axes with respect to said plate for movement of at least one end effector in a plurality of operational directions while the pressure bar is held against a workpiece.

10. An automatic machine tool according to claim 3, wherein said operating head is L-shaped.

11. An automatic machine tool according to claim 3, wherein said coupling equipment includes a secondary support having a contour and for supporting an end effector with tools having tips, said secondary support including a stop plate integral with said secondary support, said displacement means being effective to move said coupling equipment along one of the Cartesian axes of said displacement means for moving tools of an end effector connected to said secondary support from a retracted position within the contour of said secondary support to an operating position in which the end effector is advanced to meet the stop plate, the tip of each tool carried by the end effector supported on the secondary support, in the operating position of the end effector, being equidistant from one of the rotational axes of the operating head on the main support.

12. An automatic machine tool according to claim 3, wherein said coupling equipment is positioned outside a contour of the operating head so that end effectors having tools of any length can be connected to said coupling equipment.

13. An automatic machine tool according to claim 10, wherein said coupling equipment is positioned outside a contour of the operating head so that end effectors having tools of any length can be connected to said coupling equipment.

14. An automatic machine tool according to claim 3, including a pressure bar mounted for movement to said coupling equipment, said pressure bar including a hole through one end thereof through which a tool of an end effector mounted to said coupling equipment may pass when said displacement means moves the coupling equipment in one of the Cartesian axes of the displacement means, pressure means operatively connected to said pressure bar for moving said pressure bar against a part to be machined by said automatic machine tool, and sensor means connected to said pressure bar for sensing movement of said pressure bar, said sensor means being connected to said displacement means for operating said displacement means to move said coupling equipment along at least one of the Cartesian axes of said displacement means as a result of the movement of said pressure bar.

15. An automatic machine tool according to claim 14, wherein said pressure bar comprises a lever pivotally mounted to said coupling equipment, said pressure means and said sensor means being connected to said lever on a side of said lever opposite from said hole.

16. An automatic machine tool according to claim 3, wherein said three Cartesian axes comprise principal axes of said automatic machine tool, said operating head and said displacement means operating to move said coupling equipment to locations for performing multiple operations with an end effector, without movement along said principal axes.

17. An automatic machine tool according to claim 1, wherein said operating head is L-shaped.

18. An automatic machine tool according to claim 9, wherein said head is L-shaped.

* * * * *